(12) United States Patent
Kagaya (10) Patent No.: US 9,008,498 B2
(45) Date of Patent: Apr. 14, 2015

(54) THREAD FIXING MECHANISM

(71) Applicant: Panasonic Corporation, Osaka (JP)

(72) Inventor: Naritoshi Kagaya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 15 days.

(21) Appl. No.: 13/895,449

(22) Filed: May 16, 2013

(65) Prior Publication Data

US 2014/0079478 A1     Mar. 20, 2014

(30) Foreign Application Priority Data

Sep. 14, 2012    (JP) ................................. 2012-202569

(51) Int. Cl.
    *G03B 13/02*       (2006.01)
    *F16B 7/18*        (2006.01)
    *G03B 17/56*       (2006.01)
    *G03B 17/02*       (2006.01)

(52) U.S. Cl.
    CPC .................. *F16B 7/18* (2013.01); *Y10T 403/68* (2015.01); *G03B 17/568* (2013.01); *G03B 13/02* (2013.01); *G03B 17/02* (2013.01)

(58) Field of Classification Search
    CPC ........ G03B 13/02; G03B 13/06; G03B 17/18; G03B 17/14; G02B 23/14; G02B 7/026; H04N 5/23293; H04N 5/2254
    USPC ........ 396/373, 533, 535; 348/333.01, 333.07, 348/333.09, 373, 375; 359/829; 403/343
    See application file for complete search history.

(56) References Cited

U.S. PATENT DOCUMENTS

| | | | | |
|---|---|---|---|---|
| 2,238,371 | A * | 4/1941 | Pollock | 396/533 |
| 5,172,447 | A * | 12/1992 | Tomm | 15/159.1 |
| 5,722,785 | A * | 3/1998 | Diener | 403/202 |
| 8,335,427 | B1 * | 12/2012 | Schmidt et al. | 396/534 |

FOREIGN PATENT DOCUMENTS

JP         64-15471 U     1/1989

* cited by examiner

*Primary Examiner* — Rochelle-Ann J Blackman
(74) *Attorney, Agent, or Firm* — Panasonic Patent Center (57) ABSTRACT

A viewfinder fixing device comprises a holder, a ring, a washer, a dowel, and a plurality of inner peripheral concave-convex portions. The holder has a male thread portion. The ring has a female thread portion that meshes with the male thread portion. The washer is provided between the holder and the ring. The dowel is provided to the washer. The inner peripheral concave-convex portions are provided in the peripheral direction to the ring, and when the ring is turned, the male thread portion and the inner peripheral concave-convex portions cause the holder and the ring to move closer together, which is accompanied by the washer and the ring moving closer together, and the inner peripheral concave-convex portions come into contact with the dowel when the washer and the ring have moved closer together up to a specific distance.

8 Claims, 7 Drawing Sheets

THREAD FIXING MECHANISM

BACKGROUND

1. Technical Field

The present disclosure relates to a thread fixing mechanism for fixing a viewfinder of a shoulder camera, and more particularly relates to a mechanism for fixing a viewfinder by using a rotary mechanism.

2. Description of the Related Art

There is a known viewfinder for a shoulder camera in which a threaded control is turned to press-fit the viewfinder and fix it in place.

Patent Literature 1 discloses a structure in which a threaded rotary mechanism is used to press-fit and fix a viewfinder.

With this conventional fixing mechanism, the position of the viewfinder can be fixed by the threaded rotary mechanism.

PATENT LITERATURE

Patent Literature 1: Japanese Laid-Open Utility Model Application H1-15471

However, the following problem was encountered with the above-mentioned thread fixing mechanism. Specifically, a conventional thread fixing mechanism for fixing a viewfinder has a structure in which the viewfinder is press-fitted merely by tightening the threaded part. With this structure, however, if the viewfinder is subjected to vibration, impact, or the like, the threads can loosen and there is the risk that the viewfinder will accidentally fall out from where it was fixed.

SUMMARY

It is an object of the present disclosure to provide a thread fixing mechanism that avoids the loosening of threads and prevents a viewfinder from falling out.

The thread fixing mechanism disclosed herein comprises a first member, a rotary control, a second member, a protrusion, and a plurality of concave-convex portions. The first member has a male thread portion. The rotary control has a female thread portion that meshes with the male thread portion. The second member is provided between the first member and the rotary control. The protrusion is provided to either the rotary control or the second member. The plurality of concave-convex portions are provided in the peripheral direction to either the second member or the rotary control, so that when the rotary control is turned, the second member and the rotary control move closer together as the first member and the rotary control are moved closer together by the male thread portion and the female thread portion, and the concave-convex portions are in contact with the protrusion when the second member and the rotary control move closer together up to a specific distance.

With the thread fixing mechanism pertaining to the present disclosure, a viewfinder can be prevented from falling out by preventing loosening of the threads.

DETAILED DESCRIPTION OF THE PREFERRED EMBODIMENTS

A viewfinder fixing device (thread fixing mechanism) 101 pertaining to an embodiment of this disclosure will be described through reference to the drawings.

Figure 1:
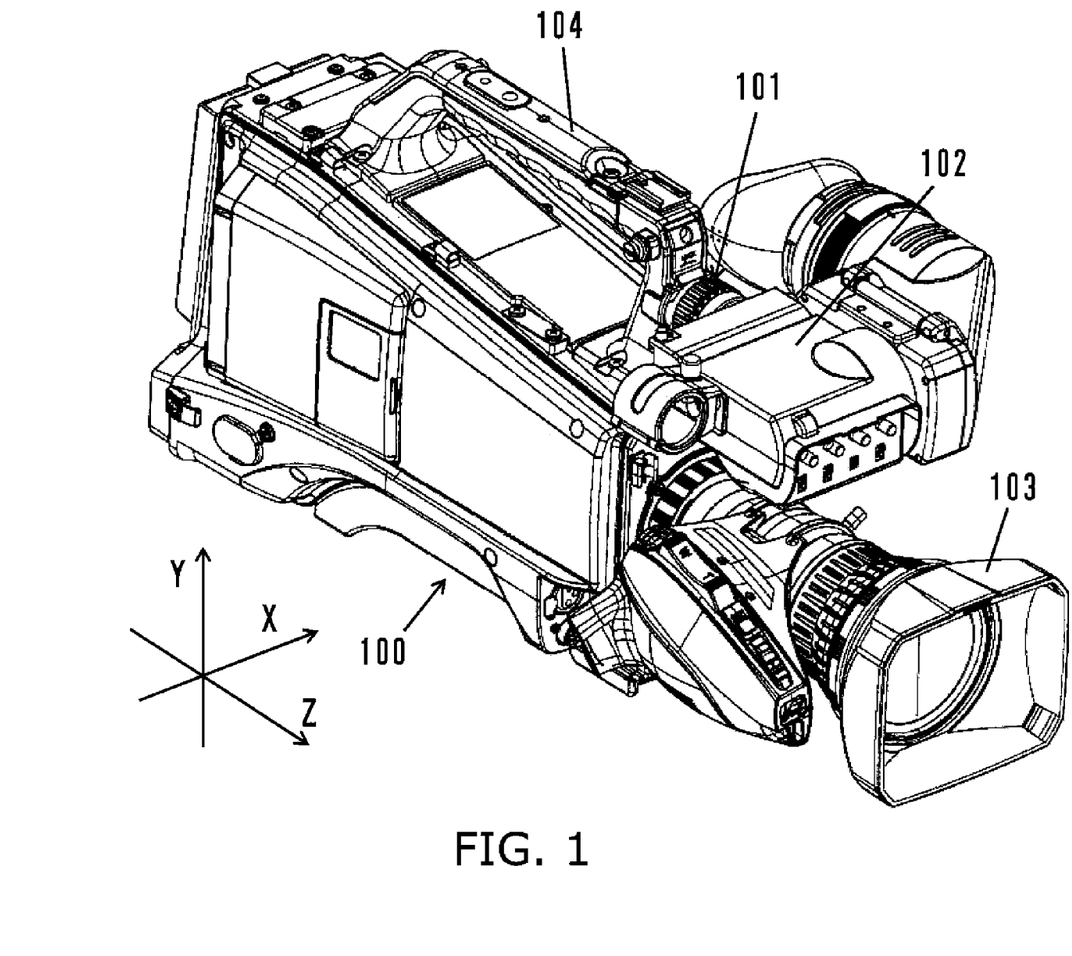
FIG. 1 is an oblique view of the configuration of a shoulder-mounted camera pertaining to an embodiment.

The X, Y, and Z directions used in the following description mean, for example, that in the usage state of a shoulder camera 100 to which a viewfinder 102 is mounted as shown in FIG. 1, the direction facing the subject is the Z direction, the substantially vertical direction is the Y direction, and the direction perpendicular to these Z and Y directions is the X direction.

First, the shoulder camera 100 and the viewfinder 102 will be described through reference to FIGS. 1 and 2.

Figure 2:
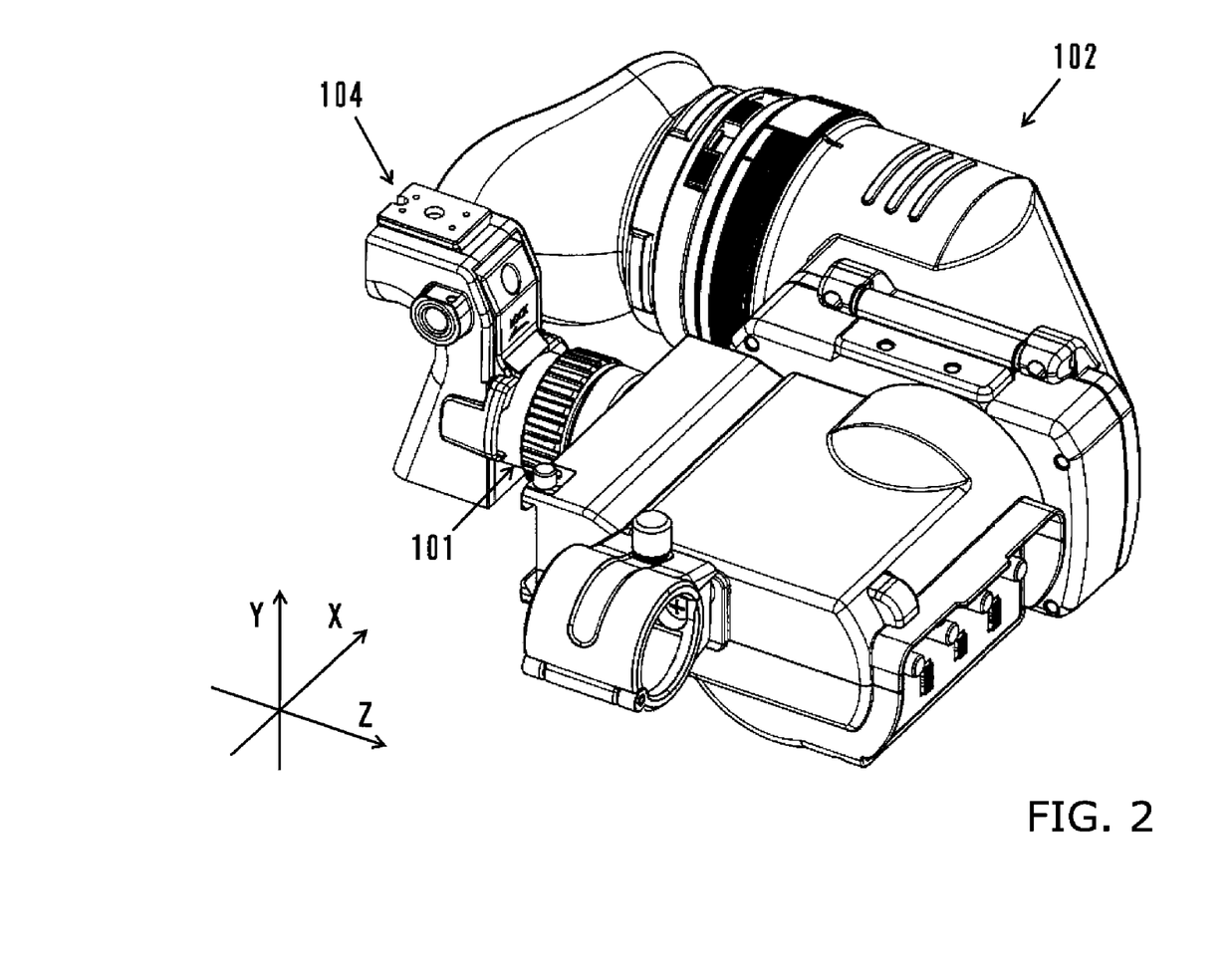
FIG. 2 is an oblique view of the configuration of a viewfinder and a viewfinder fixing device mounted to the shoulder camera in FIG. 1.

FIG. 1 is an oblique view of the configuration of the shoulder camera 100, and FIG. 2 is an oblique view of the configuration of the viewfinder 102 and the viewfinder fixing device 101.

Shoulder Camera 100

As shown in FIG. 1, the shoulder camera 100 comprises the viewfinder fixing device 101, the viewfinder 102, a lens 103, and a handle 104.

The viewfinder fixing device 101 uses a threaded mechanism to fix the viewfinder 102 in the desired position. The configuration of the viewfinder fixing device 101 will be discussed in detail below.

The viewfinder 102 shows images taken in from the lens 103 of the shoulder camera 100.

The lens 103 takes in subject images and guides them to an imaging element (not shown).

The handle 104 is used by the user to carry the camera during use. The viewfinder fixing device 101 is provided to the handle 104 on the lens 103 side. This allows the viewfinder 102 to be fixed in a specific position on the lens 103 side of the handle 104.

Viewfinder Fixing Device 101

Next, the viewfinder fixing device 101 will be described through reference to FIGS. 3 and 4.

Figure 3:
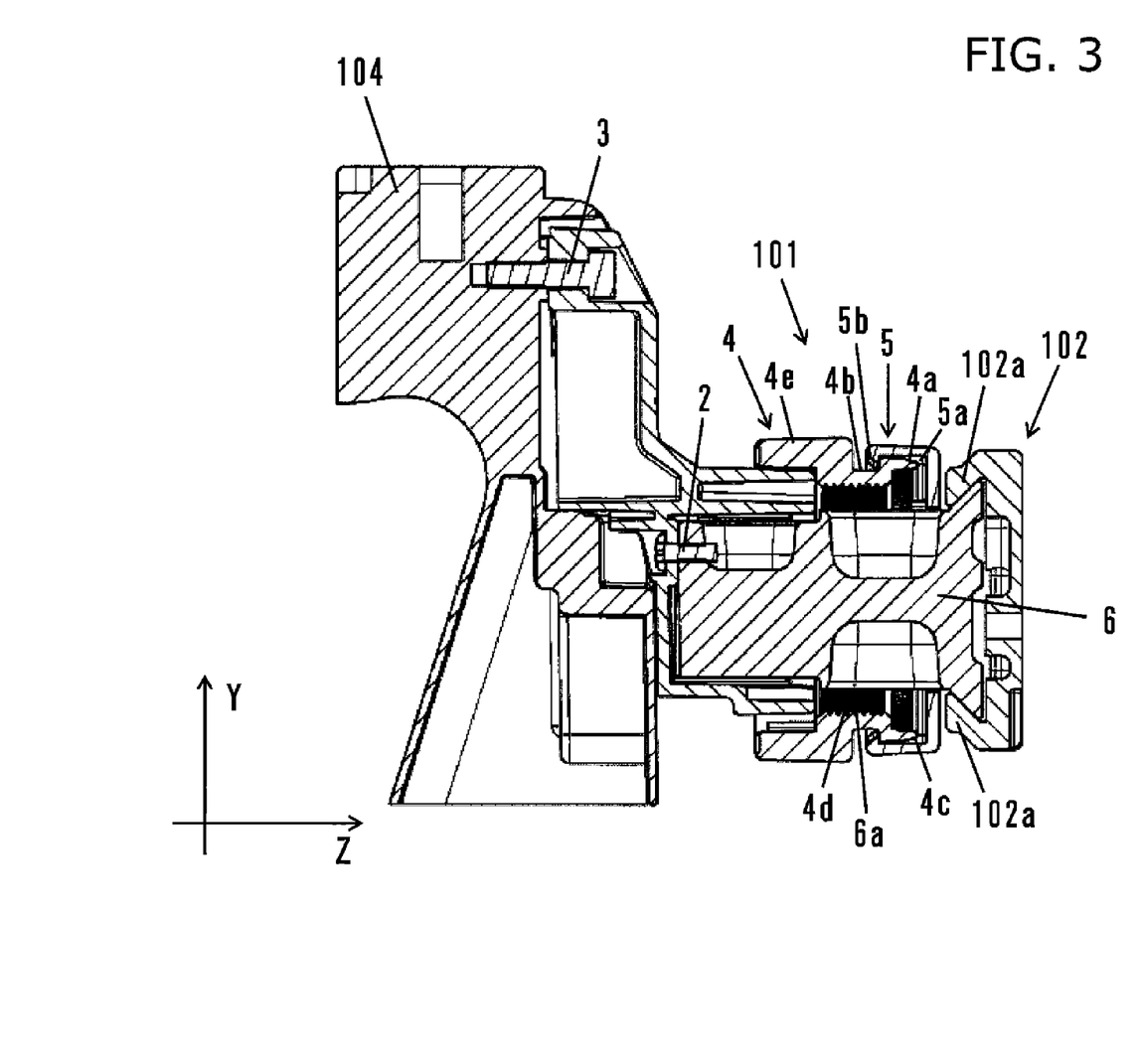
FIG. 3 is a cross section of the viewfinder and the viewfinder fixing device in FIG. 2.

FIG. 3 is a cross section of the area around the viewfinder fixing device 101 when the viewfinder 102 has been mounted to the shoulder camera 100. FIG. 4 is a developed view of the viewfinder fixing device 101.

Figure 4:
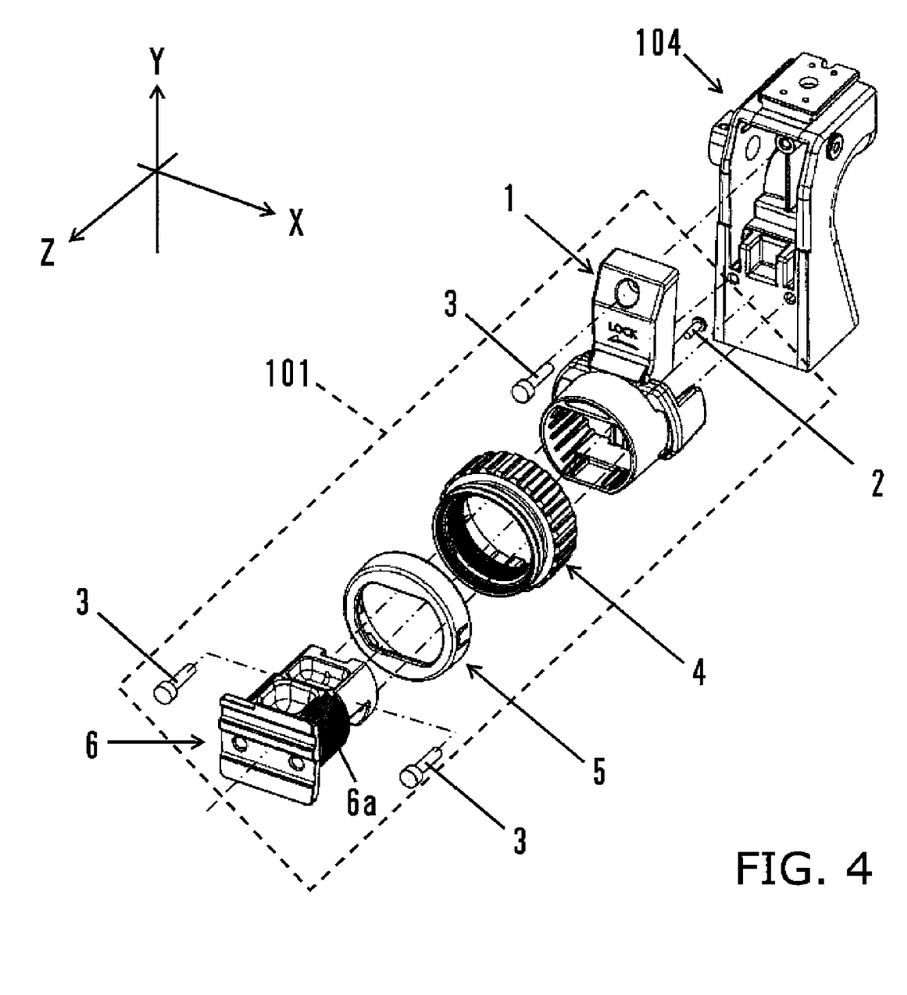
FIG. 4 is a developed view of the viewfinder fixing device in FIG. 2.

As shown in FIGS. 3 and 4, the viewfinder fixing device 101 has a frame 1, screws 2 and 3, a ring (rotary control) 4, a washer (second member) 5, and a holder (first member) 6.

As shown in FIG. 3, the viewfinder 102 has rails 102a that mate as guides with the holder 6 when the viewfinder fixing device 101 is being attached. Therefore, the viewfinder 102 can be moved to any position in the X direction in FIG. 3 by moving the holder 6 along the rails 102a at the viewfinder fixing device 101 portion.

Frame 1

As shown in FIG. 4, of the plurality of members that make up the viewfinder fixing device 101, the frame 1 is the one disposed the farthest to the handle 104 side, and forms the base portion of the viewfinder fixing device 101.

Screws 2 and 3

As shown in FIGS. 3 and 4, the screw 2 is inserted from the handle 104 side into the frame 1, and fixes the holder 6 to the frame 1.

As shown in FIGS. 3 and 4, the screws 3 are inserted from the holder 6 side, in the handle 104 direction, into the frame 1, and fix the frame 1 (to which the holder 6 has been fixed) to the handle 104.

Ring 4

Figure 5:
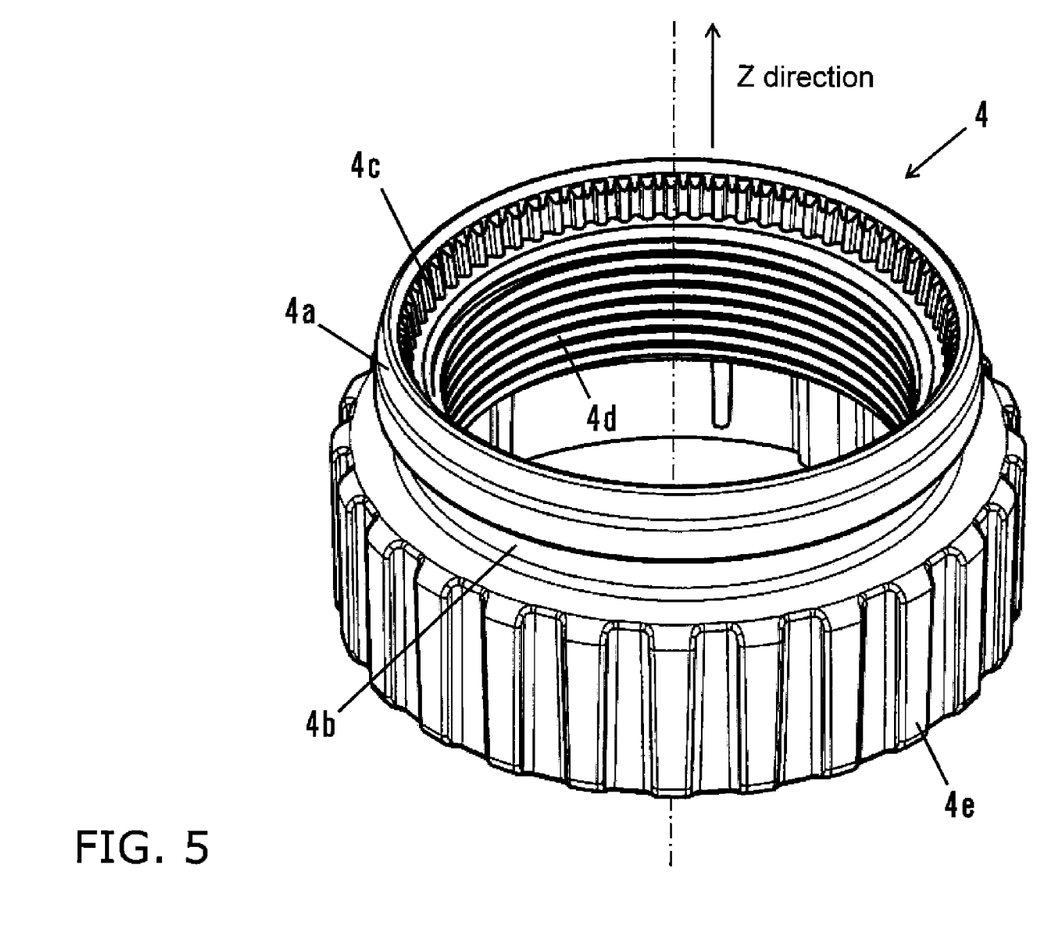
FIG. 5 is an oblique view of the configuration of a ring included in the viewfinder fixing device in FIG. 2.

Next, the configuration of the ring (rotary control) 4 will be described through reference to FIG. 5, etc. FIG. 5 is an oblique view of the configuration of the ring 4.

As shown in FIG. 4, the ring 4 is a substantially annular member, and is provided between the frame 1 and the washer 5. As shown in FIG. 5, the ring 4 has an inclined part (tapered part) 4a, a groove 4b, the inner peripheral concave-convex portions 4c, the female thread portion 4d, and outer peripheral concave-convex portions 4e.

As shown in FIG. 3, the inclined part 4a is formed at the distal end portion on the viewfinder 102 side in a state in which the viewfinder 102 has been mounted, and its outer peripheral face is inclined toward the inner peripheral side.

As shown in FIG. 3, the groove 4b is provided on the outer peripheral face side between the inclined part 4a and the outer peripheral concave-convex portions 4e in order to mate with prongs 5b on the washer 5 in a state in which the viewfinder 102 has been mounted.

As shown in FIG. 5, the inner peripheral concave-convex portions 4c are provided on the rear face side of the inclined part 4a on the inner peripheral face side of the substantially circular ring 4, that is, on the viewfinder 102 side shown in FIG. 3. The inner peripheral concave-convex portions 4c are similar to the outer peripheral concave-convex portions 4e discussed below in that they are formed by a plurality of grooves formed in the Z direction in FIG. 5, and convex portions that are adjacent to these grooves on both sides. The inner peripheral concave-convex portions 4c give the user a clicking sensation during the mounting of the viewfinder 102 when the ring 4 is turned while in contact with dowels (protrusions) 5c (see FIG. 6) of the washer 5 (discussed below), and also function as an anti-loosening mechanism for the ring 4 during use.

The female thread portion 4d is formed around the inner peripheral face of the ring 4, and the viewfinder 102 can be mounted to the shoulder camera 100 by meshing the female thread portion 4d with the male thread portion 6a on the holder 6 side. Thus, when the ring 4 is turned in a state in which the female thread portions 4d are meshed with the male thread portion 6a on the holder 6 side, the ring 4 moves in the Z direction in the drawing, allowing the viewfinder 102 to be switched between a fixed state and a released state.

The outer peripheral concave-convex portions 4e are formed by a plurality of grooves formed in the Z direction in FIG. 5, and convex portions that are adjacent to these grooves on both sides. The outer peripheral concave-convex portions 4e are what the user grasps when turning the ring 4 in order to mount the viewfinder 102 to the shoulder camera 100.

As discussed above, the user can move the ring 4 in the forward Z direction by turning the ring 4 counter-clockwise, assuming that the direction to the right is the forward X direction, the upward direction is the forward Y direction, and the field is viewed from the front. Conversely, the user can move the ring 4 in the negative Z direction by turning the ring 4 clockwise.

Washer 5

Figure 6:
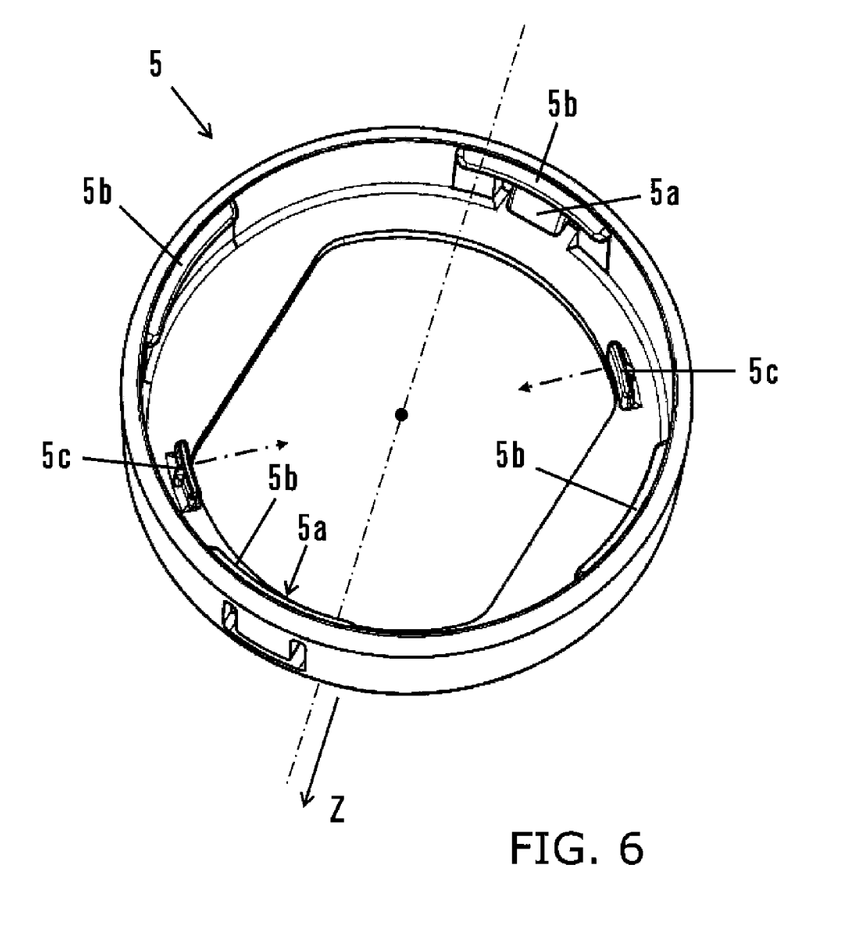
FIG. 6 is an oblique view of the configuration of a washer included in the viewfinder fixing device in FIG. 2.

Next, the configuration of the washer (second member) 5 will be described through reference to FIG. 6, etc. FIG. 6 is an oblique view of the configuration of the washer 5.

As shown in FIGS. 3 and 4, the washer 5 is provided between the 4 and the holder 6, and is attached so as to mate with the groove 4b formed in the outer periphery of the ring 4. As shown in FIG. 6, the washer 5 is a substantially annular member, and has inclined parts (tapered parts) 5a, the prongs 5b, and the dowels 5c.

As shown in FIG. 6, the inclined parts 5a are provided at two places that are mutually opposite on the inner peripheral face of the substantially annular washer 5. As shown in FIG. 3, the inclined parts 5a are disposed opposite to the inclined part 4a on the ring 4 side in a state in which the ring 4 has been mounted, and receive force from the inclined part 4a on the ring 4 side in the forward Z direction.

As shown in FIG. 6, the prongs 5b are provided at a total of four places: two places that are mutually opposite on the inner peripheral face of the substantially annular washer 5, and two places that are mutually opposite at positions rotated 90 degrees from the first two places. The prongs 5b protrude inward in the radial direction from the inner peripheral face of the washer 5. Therefore, as shown in FIG. 3, the prongs 5b mate with the above-mentioned groove 4b formed in the outer peripheral face of the ring 4. Consequently, as shown in FIG. 3, the washer 5 can be attached so as to cover the end on the inclined part 4a side of the ring 4.

The prongs 5b are able to move in the Z direction in a state in which they are mated with the groove 4b formed in the outer peripheral face of the ring 4. That is, when the ring 4 of the viewfinder fixing device 101 is turned in order to mount the viewfinder 102 to the shoulder camera 100, the female thread portion 4d on the ring 4 side meshes with the male thread portion 6a on the holder 6 side, and this changes the relative position of the ring 4 with respect to the washer 5. Therefore, when the viewfinder 102 is being mounted, the ring 4 can be moved forward with respect to the washer 5 while the prongs 5b on the washer 5 side are still mated with the groove 4b on the ring 4 side.

As shown in FIG. 6, the dowels 5c are walls erected so as to protrude in the Z direction from a face perpendicular to the Z direction in FIG. 6 on the washer 5, and have elastic force inward in the radial direction (see the one-dot chain line in FIG. 6). The dowels 5c generate a clicking sensation by coming into contact with the inner peripheral concave-convex portions 4c formed on the inner peripheral face of the ring 4 when the relative position with respect to the ring 4 in the Z direction moves closer than a specific position in the state of being mounted to the ring 4 shown in FIG. 3.

Consequently, when mounting the viewfinder 102, the user feels a clicking while turning the ring 4 portion of the viewfinder fixing device 101, which tells the user when tightening is complete.

Also, when the dowels 5c are in contact with the inner peripheral concave-convex portions 4c on the ring 4 side in a state in which the viewfinder 102 has been mounted, if vibration or impact is exerted on the viewfinder 102 or the shoulder camera 100 during use, the contact between the dowels 5c and the inner peripheral concave-convex portions 4c provides resistance to the rotation of the ring 4, which prevents the ring 4 from accidentally loosening.

Holder 6

As shown in FIG. 3, the holder (first member) 6 is fixed to the frame 1 by the screw 2. The holder 6 is also fixed to the handle 104 by the screws 3 in a state of being fixed to the frame 1.

As shown in FIG. 4, the holder 6 is a substantially cylindrical member, and has the male thread portion 6a formed on the outer peripheral portion.

As shown in FIG. 3, the male thread portion 6a meshes with the female thread portion 4d formed on the inner peripheral face of the ring 4, which allows the viewfinder 102 to be mounted on the shoulder camera 100 side.

Engagement Relation between Ring 4 and Washer 5 in Viewfinder Fixing Device 101

Next, the engagement relation between the ring 4 and the washer 5 in the viewfinder fixing device 101 will be described through reference to FIG. 7.

Figure 7:
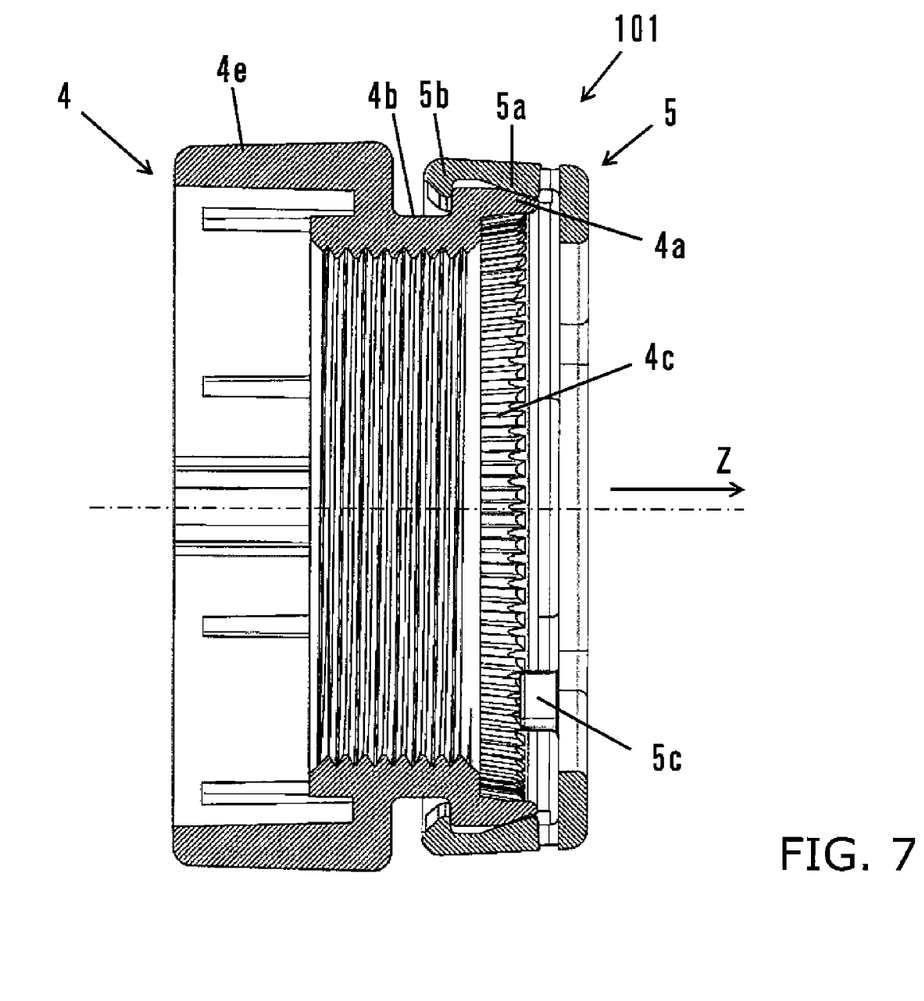
FIG. 7 is a cross section of the configuration of the joint portion of the ring and washer included in the viewfinder fixing device in FIG. 2.

FIG. 7 is a cross section of the portion where the ring and washer are engaged in the viewfinder fixing device 101.

As discussed above, the washer 5 has the inclined parts 5a, the prongs 5b, and the dowels 5c.

In the engagement state shown in FIG. 7, the inclined parts 5a are in contact with the inclined part 4a on the ring 4 side, and therefore receive force from the inclined part 4a in the forward Z direction. Also, the prongs 5b are mated with the groove 4b on the ring 4 side. Therefore, at the initial stage of turning the ring 4, the distance between the ring 4 and the washer 5 is kept constant by a force in the forward Z direction from the inclined part 4a on the ring 4 side imparted to the inclined parts 5a on the washer 5 side.

Next, the washer 5 that has moved in the forward Z direction at a constant distance from the ring 4 halts its movement in the forward Z direction at the position where it comes into contact with the rails 102a of the viewfinder 102. Meanwhile, the ring 4 is able to move farther in the forward Z direction, so the relative positional relation between the ring 4 and the washer 5 narrows as the ring 4 is turned. As a result, when the ring 4 approaches a specific position with respect to the washer 5, the dowels 5c on the washer 5 side begin to come into contact with the inner peripheral concave-convex portions 4c on the ring 4 side. From there on, turning the ring 4 produces a clicking sensation.

This clicking is a sensation that is produced every time the ends of the dowels 5c, which have elastic force inward in the radial direction, move over the convex portion of the inner peripheral concave-convex portions 4c on the ring 4 side.

Finally, the ring 4 that has moved in the forward Z direction causes the washer 5 to hit the outer faces of the rails 102a of the viewfinder 102, which fixes the viewfinder 102 at a certain position in the X direction.

With the viewfinder fixing device 101 in this embodiment, as discussed above, an indicator that tells the user that tightening is complete at the point when the user feels clicking can be provided in a mechanism that fixes the viewfinder 102 on the shoulder camera 100 side while the ring 4 is being turned.

Since an ordinary thread mechanism has no anti-loosening mechanism for the threaded part, the threaded part has to be tightened every time looseness is checked.

The viewfinder fixing device 101 of this embodiment, however, has the constitution discussed above, and therefore the dowels 5c, which have elastic force inward in the radial direction, are in contact with the inner peripheral concave-convex portions 4c on the ring 4 side in a state in which fixing of the viewfinder 102 is complete. Accordingly, to turn the ring 4 backward to loosen it, the dowels 5c have to ride up and over the inner peripheral concave-convex portions 4c just as they do during tightening.

Thus, loosening of the threads in the ring 4 can be prevented if vibration or impact should be exerted on the viewfinder 102 or the shoulder camera 100 in a state in which the viewfinder 102 has been mounted. As a result, the user will not accidentally turn the ring 4 backward and loosen the threads, which would cause the viewfinder 102 to fall off the shoulder camera 100.

Other Embodiments

An exemplary embodiment of the present disclosure was described above, but the present disclosure is not limited to or by the above embodiment, and various modifications are possible without departing from the gist of the disclosure. Non-exhaustive examples of some of the possible modifications are described next.

(A)

In the above embodiment, an example was given in which the inner peripheral concave-convex portions 4c, which generated a clicking sensation and that functioned to prevent the loosening of threads, were formed in the rotational axis direction of the ring 4 (Z direction), but the present disclosure is not limited to this.

For example, the inner peripheral concave-convex portions 4c may be grooves formed in a state of having a specific inclination with respect to the rotational axis direction of the ring 4.

(B)

In the above embodiment, an example was given in which the threaded portion was prevented from loosening by having the dowels 5c on the washer 5 side come into contact with the inner peripheral concave-convex portions 4c on the ring 4 side, but the present disclosure is not limited to this.

For example, the function of preventing the threaded portion from loosening may be achieved by combining concave-convex portions formed on the washer 5 side and dowels formed on the ring 4 side.

(C)

In the above embodiment, an example was given in which a force was generated in the forward Z direction between the inclined part 4a on the ring 4 side and the inclined parts 5a on the washer 5 side, but the present disclosure is not limited to this.

For example, the above-mentioned force in the forward Z direction may be generated by adding a part between the ring 4 and the washer 5.

(D)

In the above embodiment, an example was given in which the inclined parts 4a and 5a were provided as tapered parts to both of two portions that were in mutual contact in a state in which the ring 4 and the washer 5 were engaged, but the present disclosure is not limited to this.

For example, the tapered parts may be provided to just the ring or the washer. Here again, a force that moves the members apart may be generated by bringing the tapered part provided to one of the contact portions into contact with the opposing portion.

(E)

In the above embodiment, an example was given in which the thread fixing mechanism pertaining to this disclosure was applied to the viewfinder fixing device 101, but the present disclosure is not limited to this.

For example, the constitution pertaining to this disclosure may be applied to a thread fixing mechanism in which some other structure is fixed.

Industrial Applicability

The thread fixing mechanism of the present disclosure has the effect of preventing a viewfinder from falling off by preventing the loosening of threads, and therefore can be widely applied to other than just the above-mentioned mechanism for fixing the viewfinder of a shoulder camera.

The invention claimed is:

1. A thread fixing mechanism, comprising:
a first member having a male thread portion;
a rotary control having a female thread portion configured to mesh with the male thread portion;
a second member provided between the first member and the rotary control;
a protrusion provided on the second member; and
a plurality of concave-convex portions disposed along a peripheral direction provided on the rotary control, so that when the rotary control is turned, the second member and the rotary control move closer together as the first member and the rotary control are moved closer together by the male thread portion and the female thread portion, and the concave-convex portions come into direct contact with the protrusion when the second member and the rotary control move closer together up to a specific distance.

2. The thread fixing mechanism according to claim 1, wherein each of the plurality of concave-convex portions have a bump formed along a rotational axis direction of the rotary control.

3. The thread fixing mechanism according to claim 2, wherein:
the protrusion has an elastic force provided to face inward in a radial direction around the rotational axis direction.

4. The thread fixing mechanism according to claim 2, wherein, when the protrusion and the bumps provided on the plurality of concave-convex portions are mated, a clicking effect is produced by the protrusion continuously riding up and over the bumps of the plurality of concave-convex portions.

5. The thread fixing mechanism according to claim 1, further comprising a tapered portion provided on at least one of the second member and the rotary control, wherein, when the second member and the rotary control move closer together within a specific range, contact with the tapered portion produces a force that causes the second member and the rotary control to move away from each other.

6. The thread fixing mechanism according to claim 1, wherein:
each of the plurality of concave-convex portions have a bump formed along a rotational axis direction of the rotary control; and
when the protrusion and the bumps provided on the plurality of concave-convex portions come into contact, a clicking effect is produced by the protrusion riding up and over the bumps of the plurality of concave-convex portions.

7. The thread fixing mechanism according to claim 6, wherein the thread fixing mechanism is provided to attach a viewfinder to a camera.

8. A thread fixing mechanism, comprising:
a first member having a male thread portion;
a rotary control having a female thread portion configured to mesh with the male thread portion;
a second member provided between the first member and the rotary control;
a protrusion provided on the rotary control; and
a plurality of concave-convex portions disposed along a peripheral direction provided on the second member, so that when the rotary control is turned, the second member and the rotary control move closer together as the first member and the rotary control are moved closer together by the male thread portion and the female thread portion, and the concave-convex portions come into direct contact with the protrusion when the second member and the rotary control move closer together up to a specific distance.

* * * * *